United States Patent [19]

Bell

[11] 4,129,317
[45] Dec. 12, 1978

[54] BICYCLE

[76] Inventor: Theodore F. Bell, 400 Fentress Blvd., Daytona Beach, Fla. 32015

[21] Appl. No.: 664,238

[22] Filed: Mar. 5, 1976

[51] Int. Cl.² ............................................. B62K 3/04
[52] U.S. Cl. ................................. 280/281 R; 280/274
[58] Field of Search ................................ 280/274, 281

[56] References Cited

U.S. PATENT DOCUMENTS

| 547,734 | 10/1895 | Mesinger | 280/281 R |
| 2,187,020 | 1/1940 | Dunn | 280/281 R |
| 2,595,075 | 4/1952 | Henderson | 280/281 R |
| 3,226,132 | 12/1965 | Otani | 280/281 R |

FOREIGN PATENT DOCUMENTS

| 872372 | 6/1942 | France | 280/281 R |
| 972228 | 1/1951 | France | 280/281 R |
| 1092987 | 4/1955 | France | 280/281 R |
| 639,709 | 7/1950 | United Kingdom | 280/281 R |

Primary Examiner—Joseph F. Peters, Jr.
Assistant Examiner—Terrance L. Siemens
Attorney, Agent, or Firm—Barnes, Kisselle, Raisch & Choate

[57] ABSTRACT

A bicycle comprising a frame including a pair of substantially identical side frames which are mirror images of one another. Each side frame comprises a single length of tubular material of substantially constant cross section throughout with the ends of the single length providing vertically spaced free ends. A seat mast having a crank housing tube connected to the lower end thereof has its upper end joined to the pair of frames. A fork mounting tube of substantially constant diameter is provided between the frames, and a fork assembly is mounted for pivotal movement about the axis of the fork tube in a manner in which it can be quickly disconnected from the frame. Dropouts are in the free ends of each side frame and the ends of fork tubes of the fork assembly, and a wheel is rotatably mounted on the dropouts.

16 Claims, 15 Drawing Figures

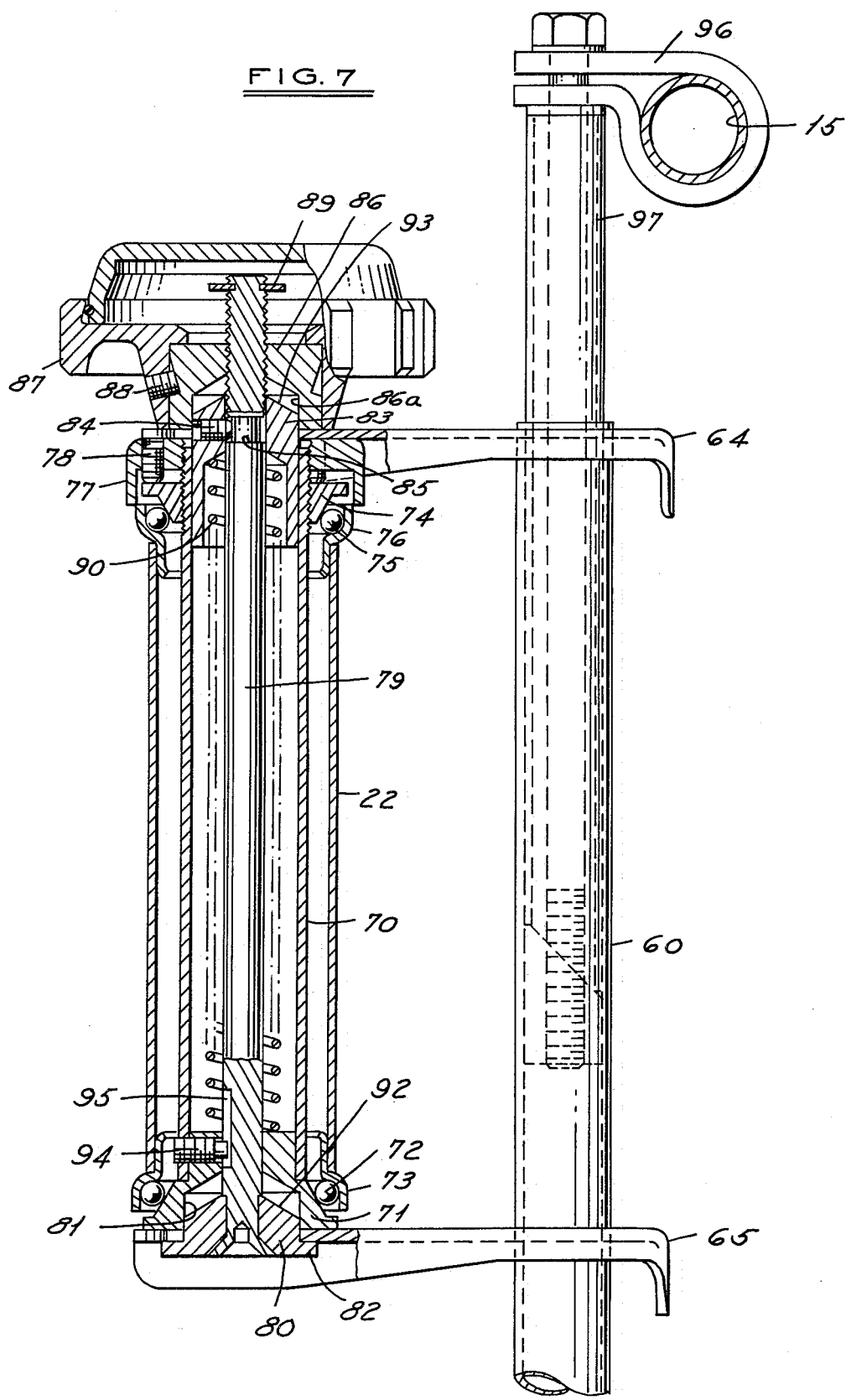

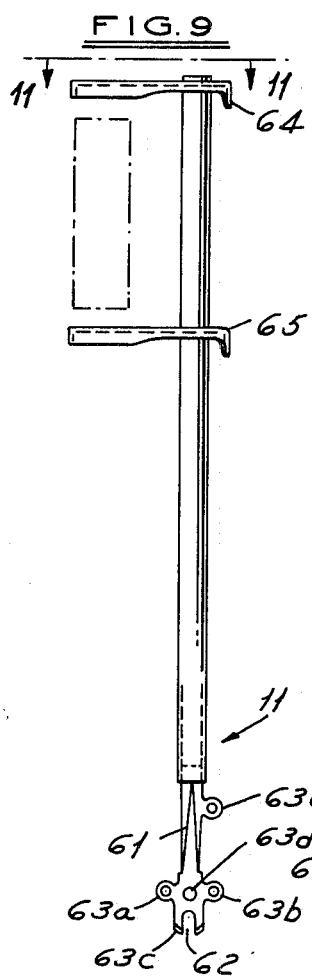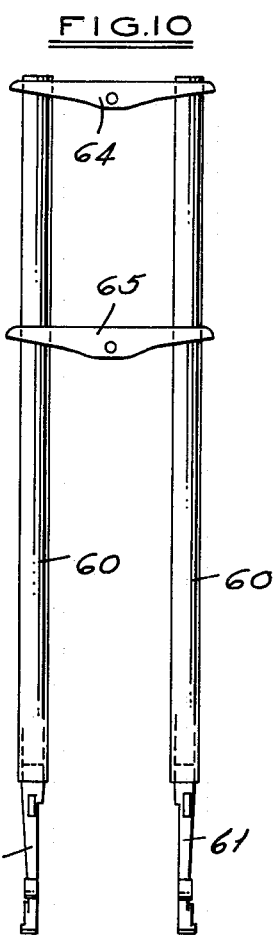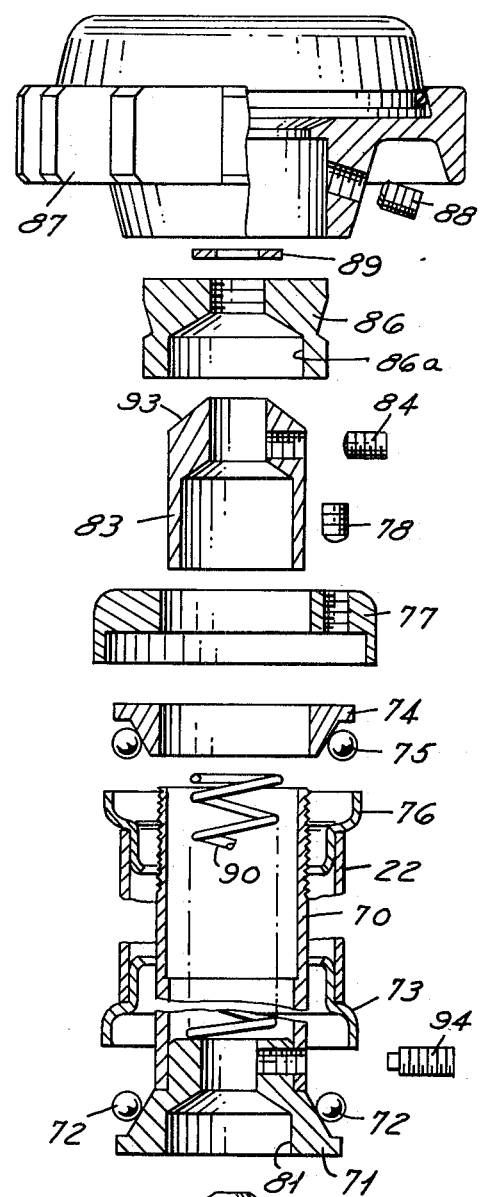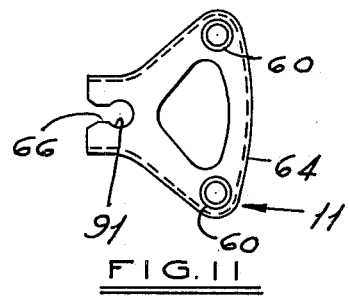

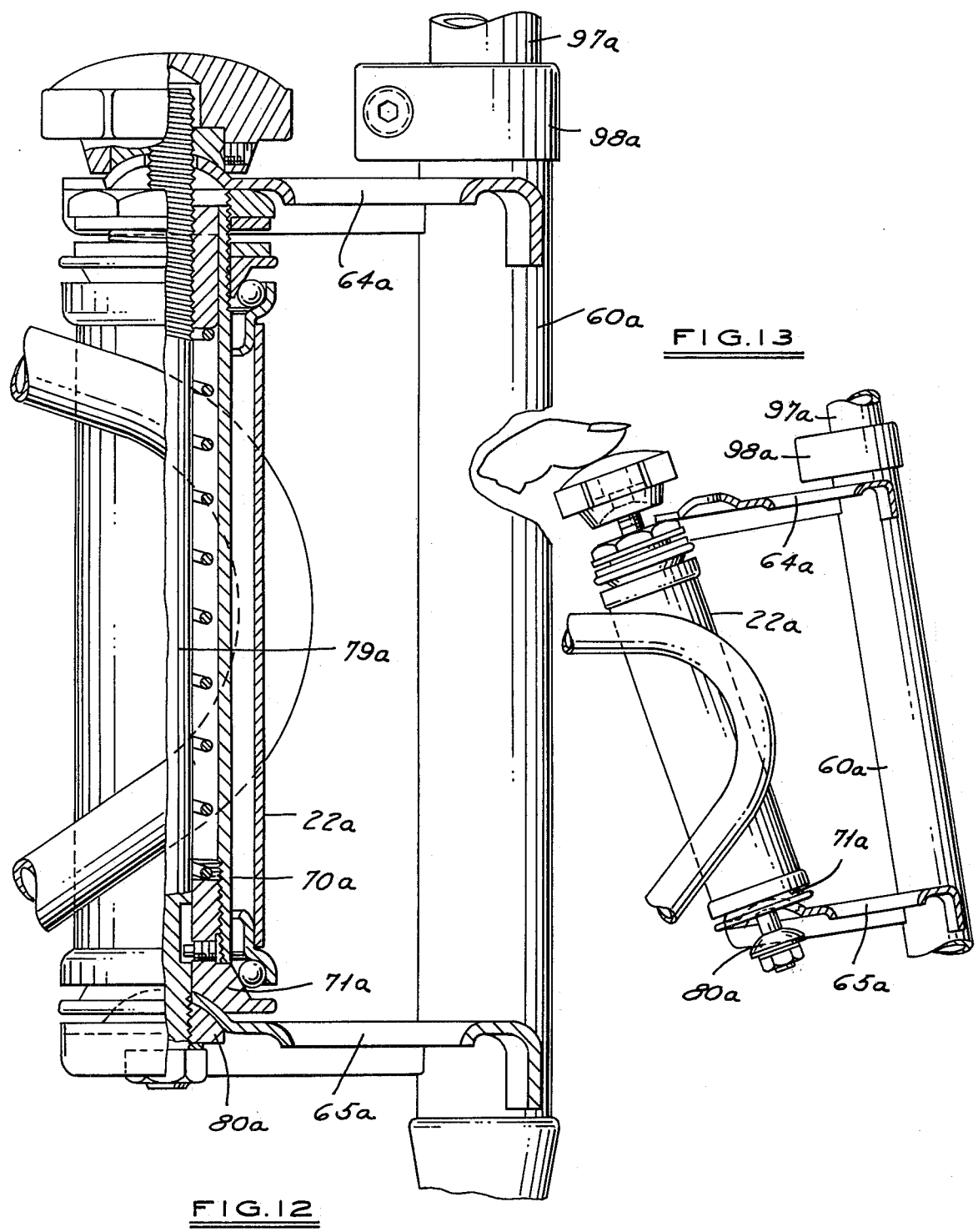

1

BICYCLE

This invention relates to bicycles.

BACKGROUND OF THE INVENTION

In the manufacture of bicycles, it has been common to utilize tubing of various diameters and to weld or otherwise connect the sections of tubing to form the frame of the bicycle. In more expensive bicycles, it is common to shape the length of tubing at various points along the frame to produce varying diameters or to flatten portions of the frame for clearance purposes and the like. In addition, it has been common to utilize couplings between lengths of tubings. Each of these types of construction not only adds to the weight and cost, but greatly complicates the manufacture of the bicycles.

In another type of bicycle, such as shown in U.S. Pat. Nos. 2,595,075, 3,226,132, 547,734 and 2,187,020, it has been suggested that the frame of the bicycles may be made by utilizing pairs of frames made of a tubing and thereafter welding or clamping the seat mast and fork tube thereto. In each of these types of bicycles, the aforementioned deficiencies in terms of cost and difficulty in manufacture are also found.

Among the objects of the invention are to provide a bicycle and a method for making a bicycle wherein the frame is manufactured at low cost, with minimum operations, has a high strength and low weight, which utilizs a novel dropout structure for connecting the wheels to the frame, which minimizes the problem of varying sizes, and which has a novel disconnectable or breakaway fork assembly.

SUMMARY OF THE INVENTION

In accordance with the invention, the bicycle embodying the invention comprises a frame including a pair of substantially identical side frames which are mirror images of one another and have a specific configuration. The bicycle includes novel structure for supporting a fork assembly for pivotal movement about the axis of the fork tube so that it can be quickly disconnected. The bicycle includes novel dropouts positioned in the free ends of each side frame and fork tubes of the fork assembly for supporting a wheel.

DESCRIPTION OF THE DRAWINGS

FIG. 7 is a vertical longitudinal sectional fragmentary view of the front fork mounting.

FIG. 8 is a fragmentary exploded view of a portion of the bicycle shown in FIG. 1.

FIG. 9 is a side elevational view of the fork.

FIG. 10 is a front elevational view of the fork.

FIG. 11 is a view taken along the line 11—11 in FIG. 9.

FIG. 12 is a vertical sectional view of a modified form of fork mounting.

FIG. 13 is a fragmentary view showing the manner of disconnecting the fork.

DESCRIPTION

Figure 1:
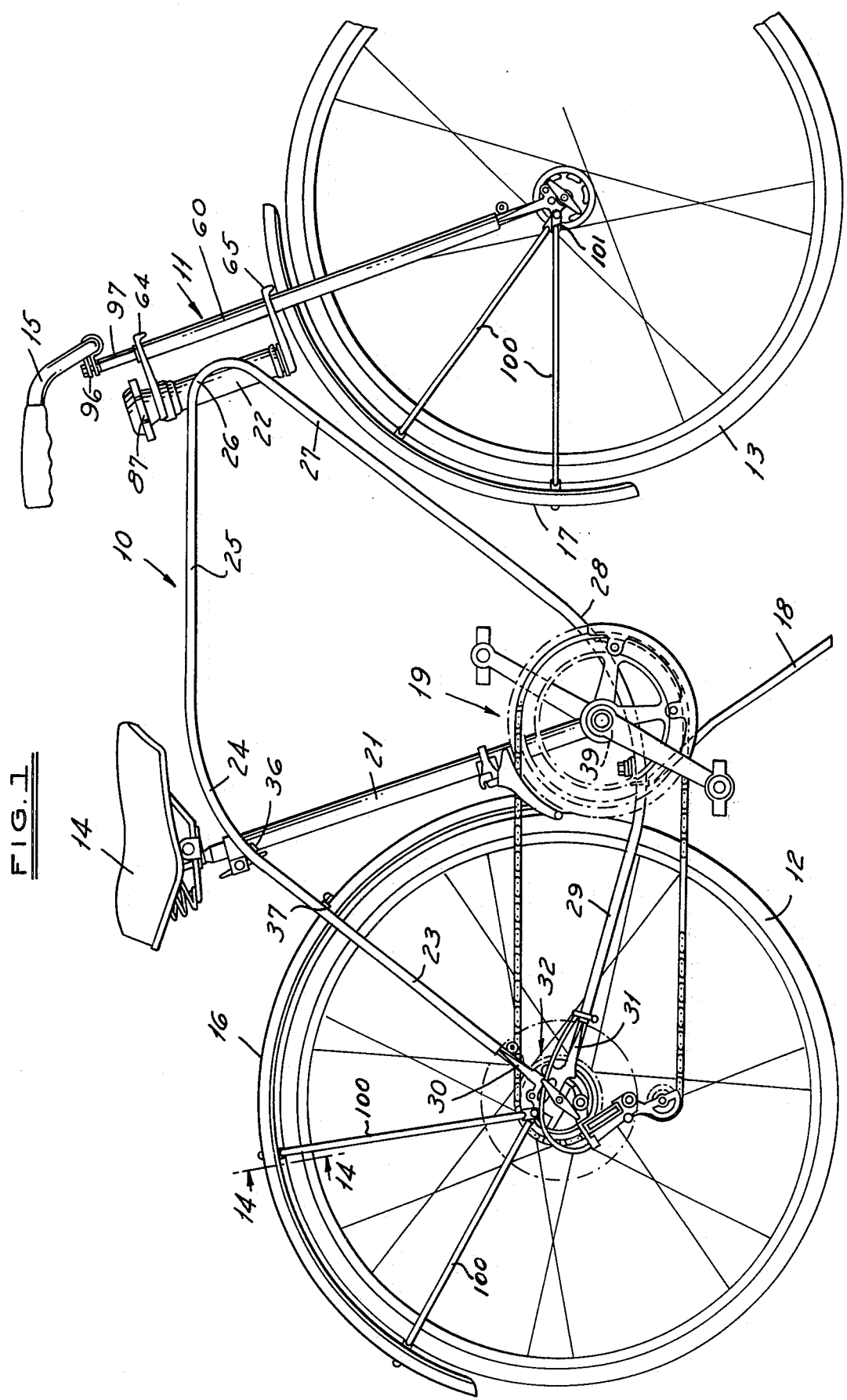
FIG. 1 is a fragmentary side elevational view of a bicycle embodying the invention.

Referring to FIG. 1, the bicycle comprises a frame 10 on which a fork assembly 11 is pivotally mounted. A wheel 12 is rotatably mounted on the frame 10 and a wheel 13 is rotatably mounted on the fork assembly 11. The bicycle includes a seat 14 mounted as presently described and handlebars 15 on the fork assembly 11, as presently described. The bicycle further includes fenders 16, 17 and a chain drive in accordance with conventional construction, the drive being shown as a multispeed drive. A kickstand 18 is mounted on the frame 10.

Referring to FIGS. 2–5, the frame 10 comprises side frame members 20a, 20b which are substantially identical mirror images of one another, a seat mast 21, and a fork mounting tube 22.

Figure 2:
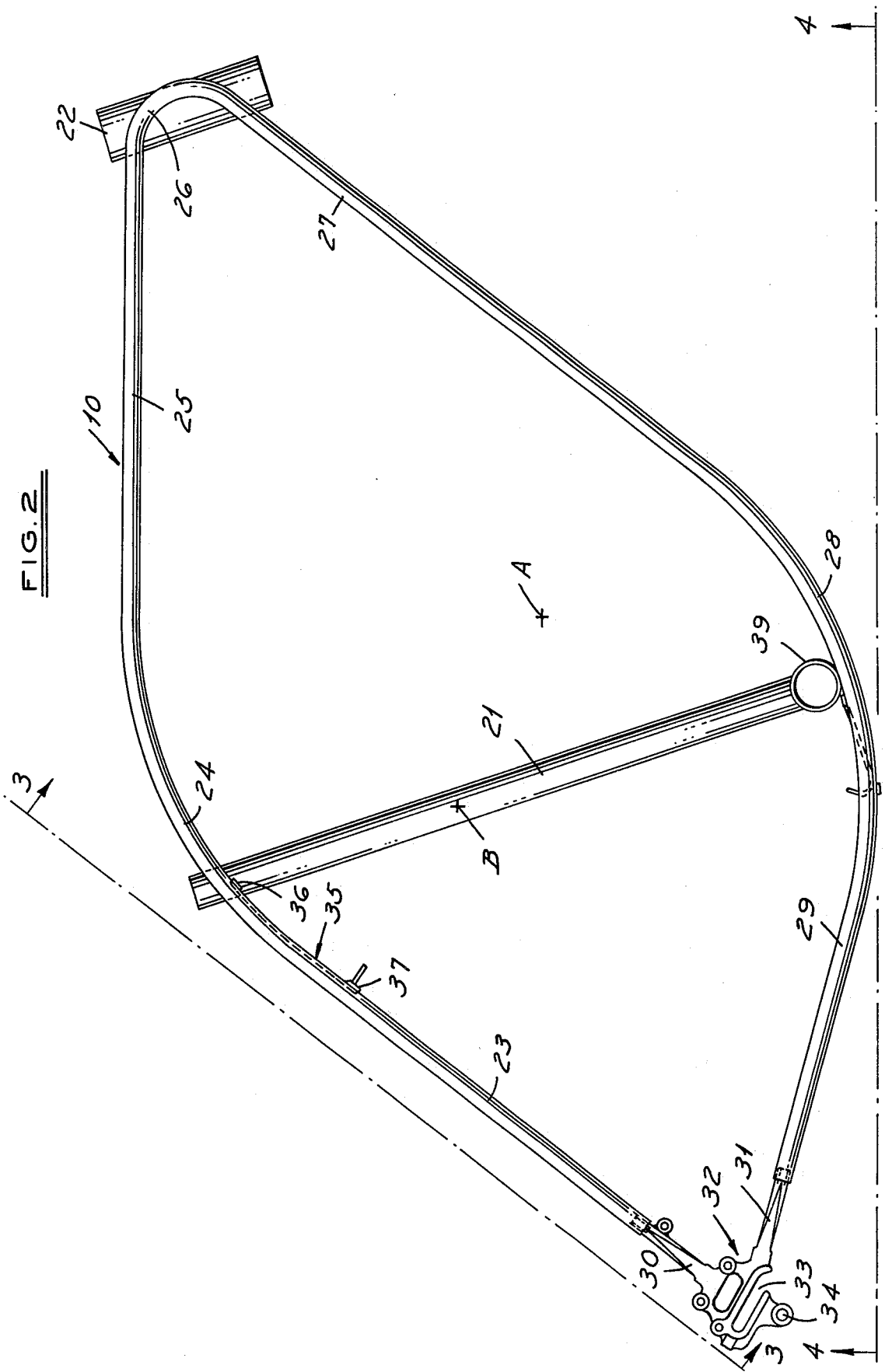
FIG. 2 is a side elevational view of the frame thereof.

Referring to FIG. 2, each of the side frames 20a, 20b is made of a single length of tubing of constant diameter through which is bent without substantially reducing the diameter to form a first downwardly, rearwardly inclined straight portion 23, a second curved portion 24 extending forwardly from the upper end of the first portion 23 and having a substantially constant radius, a third straight portion 25 extending forwardly and horizontally from the forward end of the second portion 24, a fourth curved portion 26 having a substantially constant radius extending from the front or forward end of the second portion 24 and thereafter downwardly and rearwardly to a fifth straight portion 27 that extends downwardly and rearwardly, a sixth curved portion 28 extending from the lower end of the straight portion 27 and having a substantially constant radius, and a seventh straight portion 29 extending upwardly and rearwardly from the rear of the portion 28. The rear ends of the straight, constant diameter portions 23, 29 are open and vertically spaced from one another to receive the projections 30, 31 of a bracket 32, commonly known as a dropout, which has a forwardly extending slot 33 therein for receiving the axle of the rear wheel 12 and various transverse openings 34 for mounting of accessories such as drive members, fender braces and the like. The projections 30, 31 are brazed to the portions 23, 29.

Figure 3:
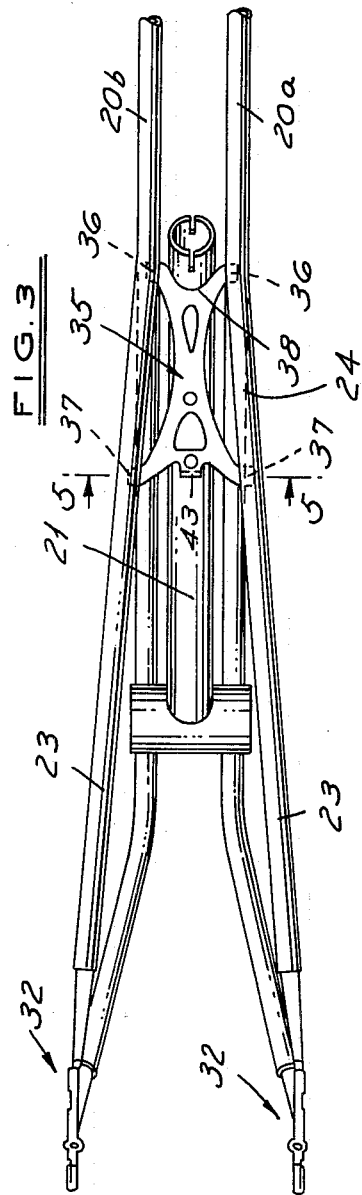
FIG. 3 is a fragmentary view taken along the line 3—3 in FIG. 4.
Figure 4:
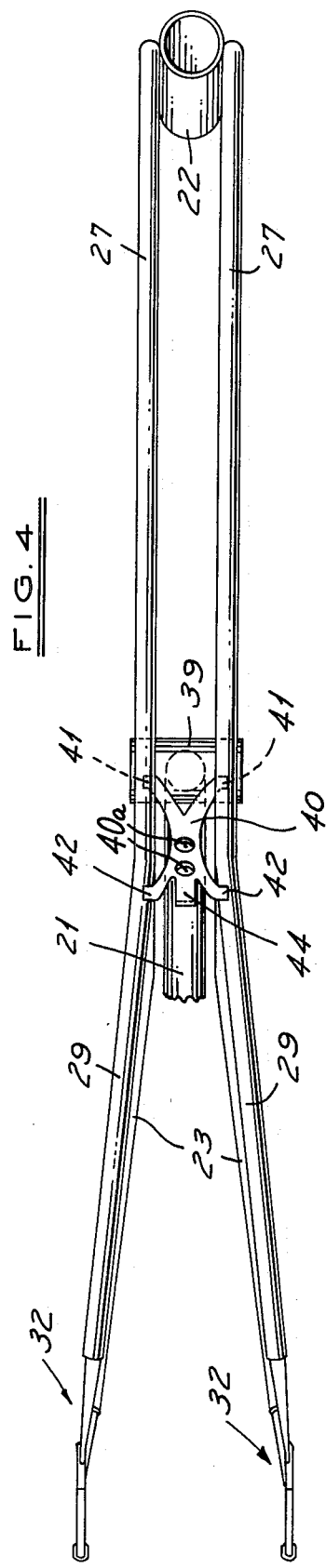
FIG. 4 is a view taken along the line 4—4 in FIG. 2.

As shown in FIG. 3, the portions 23 taper outwardly and rearwardly as well as downwardly to define a wheel receiving opening. In the same fashion, as shown in FIG. 4, the portions 29 taper outwardly and rearwardly.

Figure 5:
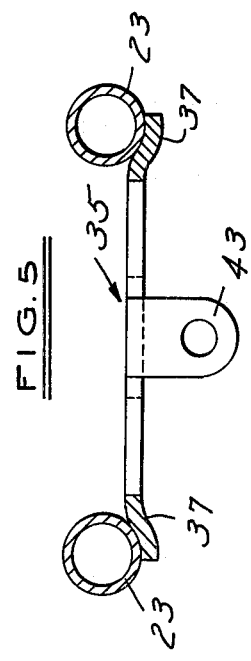
FIG. 5 is a sectional view on an enlarged scale taken along the line 5—5 in FIG. 3.

As shown in FIGS. 3 and 5, the seat mast 21 and the side frames 20a, 20b are connected to one another in proper spaced relationship by a bracket 35 which is generally X-shaped and has longitudinally spaced lateral arms 36, 37 that are brazed to the side frames, arms 36 being brazed to the underside of the curved portion 24 rearwardly of the center thereof, and arms 37 being brazed to the underside of the straight portion 23 near the juncture with curved portion 24. The bracket 35 further includes a recess 38 that generally conforms to the diameter of the mast 21 to receive the mast 21 and the bracket 35 and mast 21 are brazed to one another at the recess.

The proper spacing between the side frames and the crank housing tube 39 at the lower end of the mast 21 is achieved by another generally X-shaped bracket 40 that has longitudinally spaced arms 41, 42 that are brazed to the side frame members. Arms 41 are brazed to the side frame members on the upper surface of the curved portion 28 substantially at the center thereof, while arms 42 are brazed to portion 28 rearwardly of the center on the undersurface thereof. The crank housing 39 is also brazed directly to the upper surface of the portion 28.

Each of the brackets 35, 40 includes tabs 43, 44 to which the fender of the bicycle can be fastened.

The fork mounting tube 22 is connected to the side frame members along the sides of the portions 26 preferably by brazing. Bracket 40 includes openings 40a for mounting kickstand 18.

In accordance with the invention, the side frame members are preferably made of a strong, lightweight material having some elasticity such as chrome molybdenum alloy, preferably SAE 4130. The seat mast 21 and fork mounting tube 22 are preferably made of low carbon steel.

As shown in FIG. 2, the center of curvature A of portion 24 of each side frame lies substantially forwardly of the seat mast, while the center of curvature B of portion 28 lies along the seat mast above the midpoint thereof. In this fashion, each of the portions 24, 28 subtends a very large obtuse angle. As shown also in FIG. 2, the portion 26 subtends less than 180°.

Figure 6:
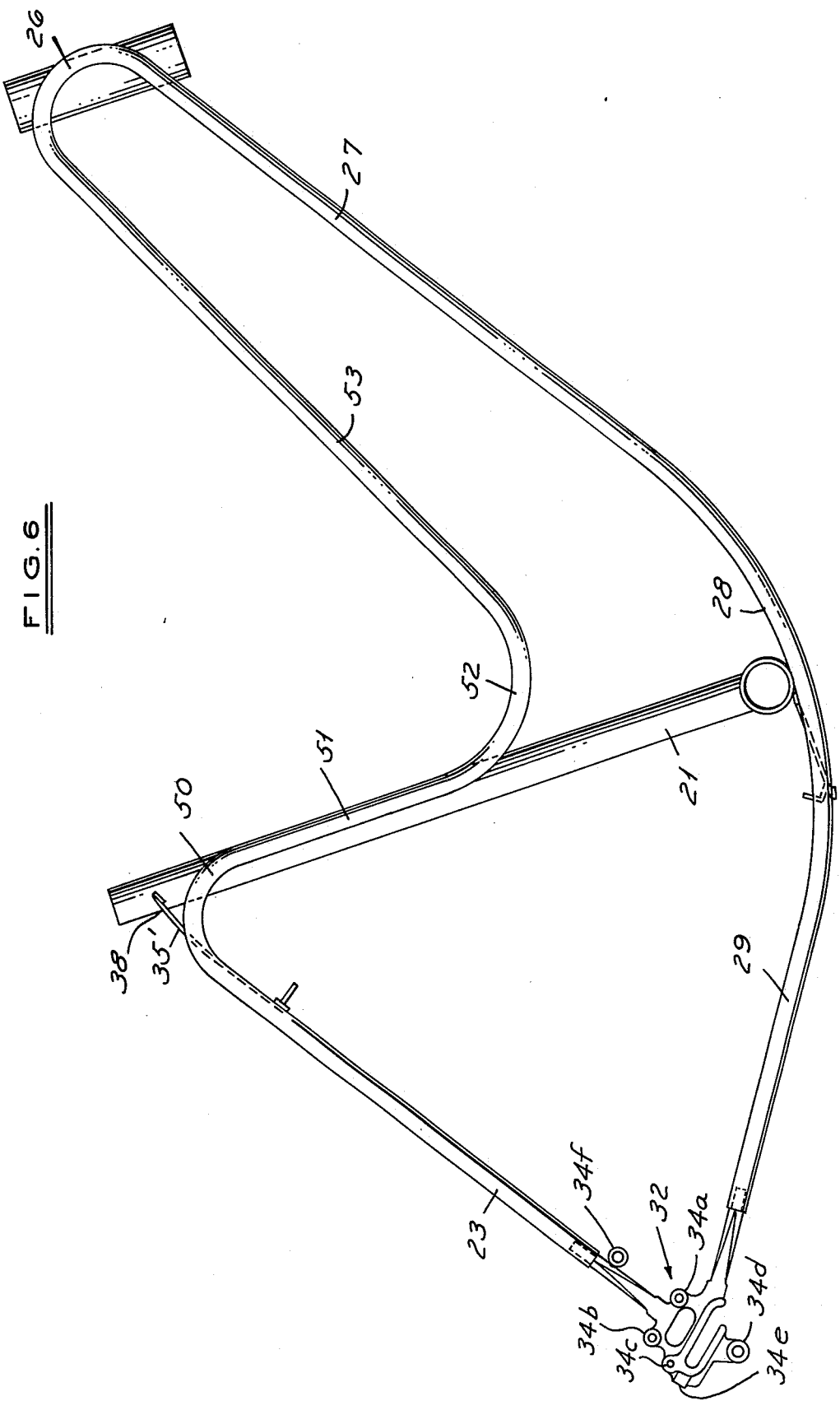
FIG. 6 is a side elevational view of a modified form of frame.

A modified form of seat frame is shown in FIG. 6 which may be considered a low bar or women's version of the frame. In this frame, in order to achieve a lower bar, the portion between the portions 23 and 26 is modified by additional bends defining a curved portion 50 extending from the upper end of the portion 23 and downwardly, a straight portion 51 extending along the seat mast 21 and brazed thereto, a reversely curved portion 52 extending from the lower end of the straight portion 51, and a straight portion 53 extending upwardly and forwardly to the portion 26. Otherwise, the frame is identical including side frame portions 27, 28, 29. In this form of frame, the bracket 35' has no tabs 36 connected to the tube and the recess 38 connected to the tube.

In each of the forms of the invention, the upper end of the seat mast 21 is spaced below the upper part of portion 26 and, in the form shown in FIG. 2, also below the portion 25. In this manner, a single frame can be used for various sized persons merely by utilizing a longer seat post that extends into the seat mast 21.

Referring to FIGS. 7-11, the front fork assembly 11 comprises spaced fork tubes 60 of substantially constant diameter having brackets 61 or dropouts telescoped therein and brazed thereto. Each bracket includes a slot 62 for receiving the front wheel axle as well as openings 63 for the mounting of accessories such as fenders, front wheel brake parts, and the like.

The fork assembly 11 further includes longitudinally spaced fork brackets 64, 65 having openings therein through which the tubes extend and to which the tubes are fixed as by brazing. The brackets 64, 65 extend rearwardly and are made of stampings as shown in FIG. 11 and include keyslots 66.

As previously indicated, the dropout brackets 32, 61 have various openings 34 and 63, respectively, for mounting components and accessories. More specifically, the dropout brackets 32 have openings 34a for chain guard, 34b for rear carrier, 34c for fender brackets, 34d for derailer mount (right side only), 34d for alignment screws, and 34f for new bracket mount. Dropout brackets 61 have openings 63a for fender brackets, 63b for front basket, 63c for safety stop-axle nut, 64d for safety clip retainer hole, and 63e for brake system.

The structure for removably mounting the fork on the tube is shown in FIGS. 7 and 8 and includes an inner tube 70 having a member 71 fixed on the lower end thereof and having a conical surface defining an inner race for receiving ball bearings 72, while the outer race is defined by a flange 73 on the fork mounting tube 22. The inner tube 70 further includes a nut 74 threaded on the upper end thereof and having a conical surface defining the inner race for ball bearings 75, while the outer race 76 is formed by a flange on the upper end of the fork mounting tube 22. A height adjusting nut 77 is also threaded on the upper end of the inner tube 70 and the position thereof axially is determined by an axial set screw 78 engaging the upper surface of the nut 74.

A fork rod 79 extends axially within the inner tube 70 and the fork mounting tube 22 and has a spool 80 on the lower end thereof which extends into an opening 81 in the member 71. Spool 80 has a flange 82 thereon which is adapted to engage the underside of the lower bracket 65 of the fork assembly, as presently described. A second spool 83 is provided on the upper end of the rod 79 and is held rotatably therein by a set screw 84 extending into an annular groove 85. The upper spool 83 telescopes within an opening 86a of a nut 86 threaded on the upper end of the rod. The nut is manipulated by a knob 87 locked to the nut 86 by a set screw 88. A C-shaped spring washer 89 in a groove on the upper end of the rod 79 limits the extent to which the knob 87 can be threaded upwardly on the rod 79. A helical spring 90 is interposed between the spool 83 and the member 71 and yieldingly urges the rod 79 upwardly.

When the knob 87 is threaded upwardly and a downward axial force is applied to the rod 79 against the action of the spring 90, a space is provided so that the slot 66 on the lower bracket 65 will permit the bracket to be inserted and assume a position between the member 71 and flange 82 of lower spool 80 on rod 79. The opening 91 of the keyslot 66 has substantially the same diameter as the spool 80.

Similarly, a space is provided upon depressing of the knob to permit the upper bracket 64 to be moved transversely of the rod 79 and permit the spool 83 to move through the opening 91 of the upper bracket 64.

The upper surfaces of the spools 80, 83 are inclined or tapered as at 92, 93 to facilitate the movement of the rod upwardly into the openings 91 of the brackets 64, 65. By tightening the knob 87, the fork is thereby locked in position. It may be noted that due to the presence of the spring 90 which urges the spools 80, 83 upwardly, the fork will remain in proper operative position on the bicycle even if the knob 87 is loose.

A set screw 94 is threaded transversely in inner tube 70 and has a reduced end extending into a groove 95 in fork rod 79 to limit the axial movement of rod 79 relative to tube 70.

In the form of the invention shown in FIGS. 12 and 13, the fork brackets 64a, 65a include deformed portions which are complementary to the bottom surface of the member 71a and the top surface of the spool 80a. In this form, the slots in the brackets are straight and not key-shaped. As in the previous form of the invention, by depressing the knob against the action of the spring, sufficient space is provided for insertion of the brackets (FIG. 13).

In each of the forms of fork assembly shown in FIGS. 7-13 inclusive, the handlebars 15 are mounted by brackets 96 on posts 97 that are telescoped within the tubes 60 and clamped by a clamp 98 in adjusted position.

Figure 14:
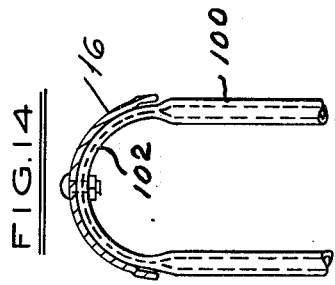
FIG. 14 is a fragmentary sectional view through a fender showing the mounting strut.

As shown in FIG. 14, the fenders are mounted on struts 100 which are made from aluminum tubing that is flattened at its ends 101 to form the mounting to the dropouts 32, 61. In addition, the tubing is flattened intermediate its ends as at 102 and bent into a U-shape to form a support for the attachment of fenders 16, 17. The struts thus form a strong support for the fenders without any sharp edges.

I claim:

1. The method of making a bicycle frame comprising
   forming a pair of substantially identical side frames which are mirror images of one another from a pair of lengths of tubular material of substantially constant cross section throughout by bending each said side length to form a first downwardly and rearwardly inclined straight portion, a second curved portion connected to said first portion and extending upwardly and forwardly and having a substantially constant radius, a third straight horizontal portion extending from said second portion forwardly, a fourth portion of substantially constant radius connected to the forward end of said third portion and extending forwardly and then downwardly and rearwardly, a fifth straight portion connected to said fourth portion and extending downwardly and rearwardly, a sixth curved portion connected to said fifth portion and having a substantially constant radius, and a seventh substantially straight portion connected to said sixth portion and extending upwardly and rearwardly to a free end, such that the free end of said first portion and the free end of said seventh portion are vertically spaced from one another,
   connecting a crank housing tube to the lower end of a seat mast,
   joining the upper end of said seat mast to said second portions of the pair of frames by brazing the seat mast to a bracket and the bracket to said frames without deforming the seat mast or second portions of the pair of frames,
   joining the crank housing to the sixth portion of said pair of frames by brazing a bracket to said housing and said frames without deforming said bracket, said housing or said frames,
   brazing a fork tube of substantially constant diameter between said fourth portions of said side frames without deforming said fork tube and said fourth portions.

2. The method set forth in claim 1 including brazing dropouts in said free ends of said first and sixth portions of each said side frame without distorting said free ends.

3. In a bicycle, the combination comprising
   a frame,
   said frame comprising a pair of substantially identical side frames which are mirror images of one another,
   each side frame comprising a single length of tubular material of substantially constant cross section throughout,
   each said side frame including a first downwardly and rearwardly inclined straight portion,
   a second curved portion connected to said first portion and extending upwardly and forwardly and having a substantially constant radius,
   a third straight horizontal portion extending from said second portion forwardly,
   a fourth portion of substantially constant radius connected to the forward end of said third portion and extending forwardly and then downwardly and rearwardly,
   a fifth straight portion connected to said fourth portion and extending downwardly and rearwardly,
   a sixth curved portion connected to said fifth portion and having a substantially constant radius,
   and a seventh substantially straight portion connected to said sixth portion and extending upwardly and rearwardly to a free end,
   such that the free end of said first portion and the free end of said seventh portion are vertically spaced from one another,
   a seat mast,
   a crank housing tube connected to the lower end of said seat mast,
   means for joining the upper end of said seat mast to said second portions of the pair of frames at the juncture with the first portions,
   means for joining the crank housing to the sixth portion of said pair of frames,
   a fork mounting tube of substantially constant diameter mounted between said fourth portions of said frame,
   the upper end of said seat mast terminating substantially below the third horizontal straight portion of the side frame members.

4. In a bicycle, the combination comprising
   a frame,
   said frame comprising a pair of substantially identical side frames which are mirror images of one another,
   each side frame comprising a single length of tubular material of substantially constant cross section throughout,
   each said side frame including a first downwardly and rearwardly inclined straight portion,
   a second curved portion connected to said first portion and extending upwardly and forwardly and having a substantially constant radius,
   a third straight horizontal portion extending from said second portion forwardly,
   a fourth portion of substantially constant radius connected to the forward end of said third portion and extending forwardly and then downwardly and rearwardly,
   a fifth straight portion connected to said fourth portion and extending downwardly and rearwardly,
   a sixth curved portion connected to said fifth portion and having a substantially constant radius,
   and a seventh substantially straight portion connected to said sixth portion and extending upwardly and rearwardly to a free end,
   such that the free end of said first portion and the free end of said seventh portion are vertically spaced from one another,
   a seat mast,
   a crank housing tube connected to the lower end of said seat mast,
   means for joining the upper end of said seat mast to said second portions of the pair of frames,
   means for joining the crank housing to the sixth portion of said pair of frames, a fork mounting tube of substantially constant diameter mounted between said fourth portions of said frame, said means for fastening the upper end of said seat mast to said side frame members comprising a bracket brazed to said side frame members and to said seat mast, said bracket comprising longitudinally spaced arms brazed to the underside of said first portion and second portion of each side frame and a recess into which the seat mast extends and where the seat mast is brazed to said bracket.

5. The combination set forth in claim 4 wherein said bracket is generally X-shaped.

6. The combination set forth in claim 5 wherein said bracket includes a tab at the rear end thereof for fastening of a fender.

7. In a bicycle, the combination comprising
a frame,
said frame comprising a pair of substantially identical side frames which are mirror images of one another,
each side frame comprising a single length of tubular material of substantially constant cross section throughout,
each said side frame including a first downwardly and rearwardly inclined straight portion,
a second curved portion connected to said first portion and extending upwardly and forwardly and having a substantially constant radius,
a third straight horizontal portion extending from said second portion forwardly,
a fourth portion of substantially constant radius connected to the forward end of said third portion and extending forwardly and then downwardly and rearwardly,
a fifth straight portion connected to said fourth portion and extending downwardly and rearwardly,
a sixth curved portion connected to said fifth portion and having a substantially constant radius,
and a seventh substantially straight portion connected to said sixth portion and extending upwardly and rearwardly to a free end,
such that the free end of said first portion and the free end of said seventh portion are vertically spaced from one another,
a seat mast,
a crank housing tube connected to the lower end of said seat mast,
means for joining the upper end of said seat mast to said second portions of the pair of frames,
means for joining the crank housing to the sixth portion of said pair of frames,
a fork mounting tube of substantially constant diameter mounted between said fourth portions of said frame,
said means for joining said crank housing to the sixth portion of said pair of frames comprising a bracket brazed to said sixth portion of said side frames and to said crank housing.

8. The combination set forth in claim 7 wherein said bracket has longitudinally spaced arms brazed to the underside of said sixth portion of each said side frame.

9. The combination set forth in claim 8 wherein said bracket is X-shaped.

10. The combination set forth in claim 9 wherein said bracket has a tab on a rear portion thereof forming a connection of a fender.

11. The combination set forth in claim 10 wherein said bracket has an opening therethrough forming a mounting for a kickstand.

12. In a bicycle, the combination comprising
a frame,
said frame comprising a pair of substantially identical side frames which are mirror images of one another and are made of a material having elasticity,
each side frame comprising a single length of tubular material of substantially constant cross section throughout,
each said side frame including a first downwardly and rearwardly inclined straight portion,
a second curved portion connected to said first portion and extending upwardly and forwardly and having a substantially constant radius and subtending a large obtuse angle,
a third straight horizontal portion extending from said second portion forwardly,
a fourth portion of substantially constant radius connected to the forward end of said third portion and extending forwardly and then downwardly and rearwardly,
a fifth straight portion connected to said fourth portion and extending downwardly and rearwardly,
a sixth curved portion connected to said fifth portion and having a substantially constant radius and subtending a large obtuse angle,
and a seventh substantially straight portion connected to said sixth portion and extending upwardly and rearwardly to a free end,
such that the free end of said first portion and the free end of said seventh portion are vertically spaced from one another,
a seat mast,
a crank housing tube connected to the lower end of said seat mast,
means for joining the upper end of said seat mast to said second portions of the pair of frames,
means for joining the crank housing to the sixth portion of said pair of frames,
a fork mounting tube of substantially constant diameter mounted between said fourth portions of said frame.

13. The bicycle frame set forth in claim 12 wherein the center of curvature of said second curved portion lies substantially forwardly of said seat mast and the center of curvature of said sixth curved portion lies along the seat mast above the midpoint thereof.

14. The combination set forth in claim 12 wherein said material comprises a chrome molybdenum alloy.

15. The combination set forth in claim 12 wherein said material comprises a chrome molybdenum SAE 4130 alloy.

16. In a bicycle, the combination comprising
a frame,
said frame comprising a pair of substantially identical side frames which are mirror images of one another,
each side frame comprising a single length of tubular material of substantially constant cross section throughout,
each said side frame including a first downwardly and rearwardly inclined straight portion,
a second curved portion connected to said first portion and extending upwardly and forwardly and having a substantially constant radius, a third straight horizontal portion extending from said second portion forwardly, a fourth portion of substantially constant radius connected to the forward end of said third portion and extending forwardly and then downwardly and rearwardly, a fifth straight portion connected to said fourth portion and extending downwardly and rearwardly, a sixth curved portion connected to said fifth portion and having a substantially constant radius, and a seventh substantially straight portion connected to said sixth portion and extending upwardly and rearwardly to a free end, such that the free end of said first portion and the free end of said seventh portion are vertically spaced from one another and are undistorted in diameter, a seat mast, a crank housing tube connected to the lower end of said seat mast, means for joining the upper end of said seat mast to said second portions of the pair of frames, means for joining the crank housing to the sixth portion of said pair of frames, a fork mounting tube of substantially constant diameter mounted between said fourth portions of said frame, a dropout extending into and brazed to each undistorted free end of the portions of the side frames.

* * * * *